United States Patent [19]

Tomala et al.

[11] Patent Number: 4,779,713
[45] Date of Patent: Oct. 25, 1988

[54] HYDRAULIC CLUTCH ACTIVATION SYSTEM

[75] Inventors: Ambrose Tomala, Royal Oak; Gary L. Casey, Troy; Mark A. Brooks, Sterling Heights, all of Mich.

[73] Assignee: Allied Corporation, Morris Township, N.J.

[21] Appl. No.: 921,926

[22] Filed: Oct. 22, 1986

[51] Int. Cl.$^4$ .................... F16D 25/04; F16D 13/75
[52] U.S. Cl. .................... 192/88 A; 60/594; 92/98 D; 192/85 CA; 192/91 A; 192/111 A
[58] Field of Search ............. 192/88 A, 91 A, 111 A, 192/85 CA, 98; 92/98 D; 60/584, 594

[56] References Cited

U.S. PATENT DOCUMENTS

| | | | |
|---|---|---|---|
| 2,593,192 | 4/1952 | Rockwell | 192/91 A X |
| 2,682,892 | 6/1954 | Picard . | |
| 3,187,850 | 6/1965 | Russell . | |
| 4,051,937 | 10/1977 | Garrett et al. | 192/88 A |
| 4,068,750 | 1/1978 | Gatewood . | |
| 4,069,904 | 1/1978 | Garrett et al. . | |
| 4,193,485 | 3/1980 | Johns et al. . | |
| 4,426,915 | 1/1984 | Maucher et al. | 192/111 A X |
| 4,428,471 | 1/1984 | Parker et al. . | |
| 4,456,111 | 6/1984 | Limbacher . | |
| 4,524,855 | 6/1985 | Brandenstein | 192/88 A |
| 4,526,258 | 7/1985 | Huber | 192/88 A |
| 4,585,106 | 4/1986 | Shirley | 192/91 A X |
| 4,606,449 | 8/1986 | Lederman | 192/88 A |
| 4,607,670 | 8/1986 | Compton et al. | 60/584 X |
| 4,607,737 | 8/1986 | Hans et al. | 192/91 A X |
| 4,624,290 | 11/1986 | Compton et al. | 60/584 X |
| 4,660,694 | 4/1987 | Nix et al. | 192/91 A X |

FOREIGN PATENT DOCUMENTS

| | | |
|---|---|---|
| 0074671 | 3/1983 | European Pat. Off. . |
| 2301388 | 7/1974 | Fed. Rep. of Germany . |
| 3043861 | 8/1982 | Fed. Rep. of Germany . |
| 662766 | 8/1929 | France ............ 192/91 A |
| 2370187 | 6/1978 | France . |
| 2512143 | 3/1983 | France . |
| 2531164 | 2/1984 | France . |
| 996534 | 6/1965 | United Kingdom . |
| 1346974 | 2/1974 | United Kingdom ......... 192/91 A |
| 2116282 | 9/1983 | United Kingdom . |

Primary Examiner—Rodney H. Bonck
Attorney, Agent, or Firm—Markell Seitzman; Russel C. Wells

[57] ABSTRACT

A hydraulic fluid system including a master cylinder (30) moved by a clutch pedal (34) for pressurizing a remotely located slave cylinder (50). The slave cylinder and master cylinder each including a rolling diaphragm (104, 176). The slave cylinder further including a cup-shaped piston (134) for isolating its rolling diaphragm from the rotation of a throw-out bearing (66) which is moved by the diaphragm.

14 Claims, 4 Drawing Sheets

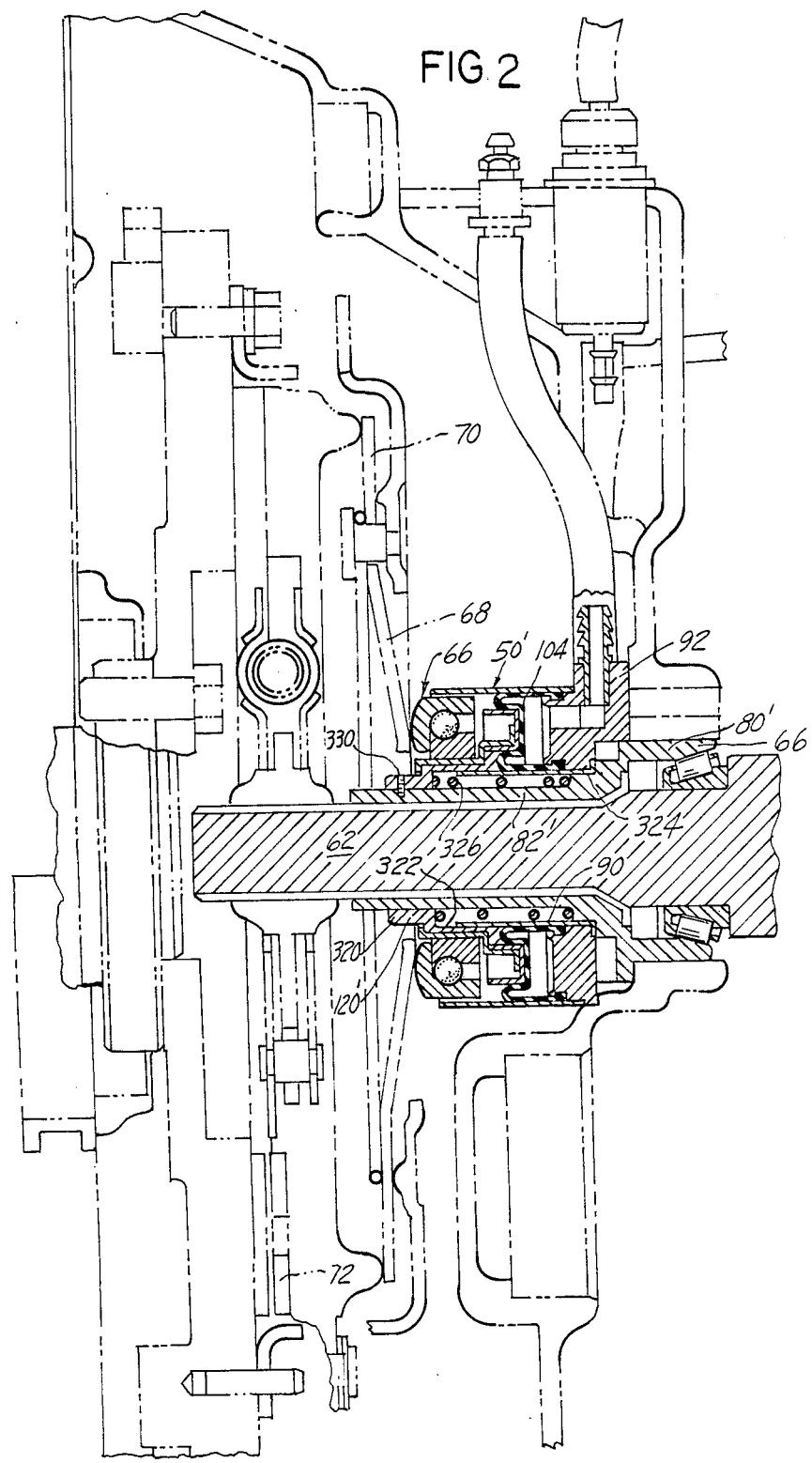

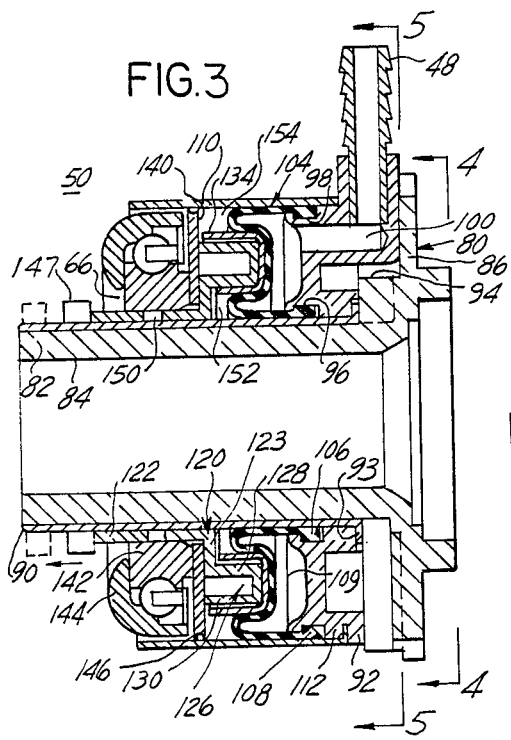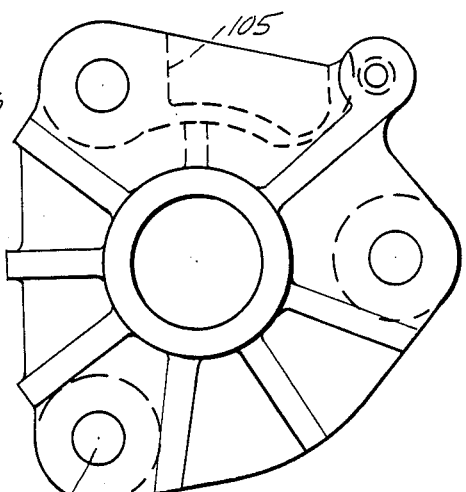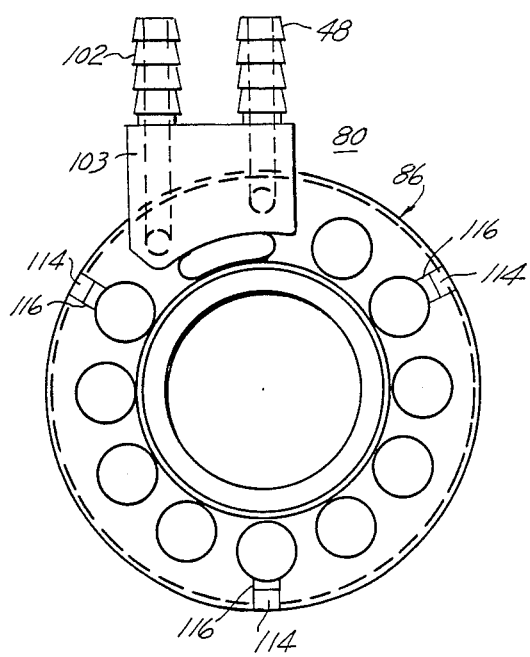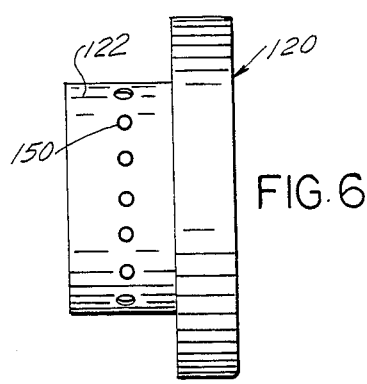

HYDRAULIC CLUTCH ACTIVATION SYSTEM

BACKGROUND AND SUMMARY OF THE INVENTION

The present invention generally relates to a system for activating hydraulic actuators and more particularly to a system including a hydraulic master cylinder for activating a remotely positioned slave cylinder to operate a clutch throw-out bearing.

The present invention replaces the mechanical clutch release system utilized in many manual transmission vehicles. This manual release system comprises a number of assemblies, such as: a clutch pedal assembly, a clutch operating cable and bushings and guides therefor, a clutch fork operating arm, a clutch fork operating shaft and associated bearings and bushings, a clutch fork, a throw-out bearing retaining pin, and the throw-out bearing cage and bearing assembly. The above system requires detailed on-the-line assembly of all interfacing mechanical components, along with the rather detailed assembly of the various associated sub-assemblies which make up the entire system. As can be seen from the above the mechanical clutch release system is relatively complicated, and relatively inefficient due to the interaction of and work losses between the various assemblies. Further, the clutch operating cable itself is a fairly delicate assembly that requires dedicated space and alignment to prevent kinking or relatively sharp bends which further detract from the systems' mechanical efficiency.

The present invention provides a hydraulic clutch actuator system which comprises a clutch pedal assembly of somewhat simpler construction than present systems. This advantageous construction is achieved by eliminating such items as the clutch pedal rod which links the clutch pedal to a torque shaft and the various springs, such as the over-center spring or pull-back spring, and various bracket members associated therewith. The present system further includes a hydraulic master cylinder located proximate the clutch pedal which is connected to a slave cylinder of relatively simple construction. In the preferred embodiment of the invention, the system comprises a pre-charged system utilizing quick connect/disconnect couplings to attach a filled hydraulic line that links the master cylinder and slave cylinder. Further prior systems with utilize remote master and slave cylinders often use diaphragms for pressurizing the fluid therein. These diaphragms often rip and leak because of the shear forces generated. The present invention provides a solution to such problems.

Accordingly, the invention comprises:

a hydraulic fluid system for engaging and disengaging clutches, such as clutches for manual transmissions comprising: a master cylinder capable of pressurizing fluid upon demand, and a slave cylinder, remote from said master cylinder for engaging the clutch. The slave cylinder comprises:

an axially expandable, variable volume activation chamber defined by a rolling diaphragm and means for securing the diaphragm. The slave cylinder further includes means for receiving pressurized fluid and for communicating same to the diaphragm; means for providing an annular support proximate to and exterior of the diaphragm, and a cup shaped piston loosely fitted to the annular support between the annular support and a portion of the diaphragm, for decoupling the diaphragm from the throw-out bearing. The walls of the piston provide first and second annular spaces into which portions of the diaphragm can enter as a throw-out bearing moves in a direction to compress the diaphragm. The invention further comprises a master cylinder for pressurizing the slave cylinder, a pre-charged hydraulic line interconnecting the master cylinder and slave cylinder and a slack adjusting or compensating mechanism for providing a predetermined free-play for a clutch pedal to compensate for the movement of various components due to the wearing of the friction plate of the clutch.

BRIEF DESCRIPTION OF THE DRAWINGS

In the drawings:

FIG. 2 illustrates one embodiment of a slave cylinder positioned within a transmission housing.

FIG. 3 is an isolated cross-section of another embodiment of a slave cylinder.

FIG. 4 illustrates an isolated plan view of a quill portion of a transmission taken through section 4—4 of FIG. 3.

FIG. 5 is a plan view of the backing plate shown in FIG. 3 taken through section 5—5 of FIG. 3.

FIG. 6 is an isolated view of a bearing support member.

DETAILED DESCRIPTION OF THE DRAWINGS

Figure 1:
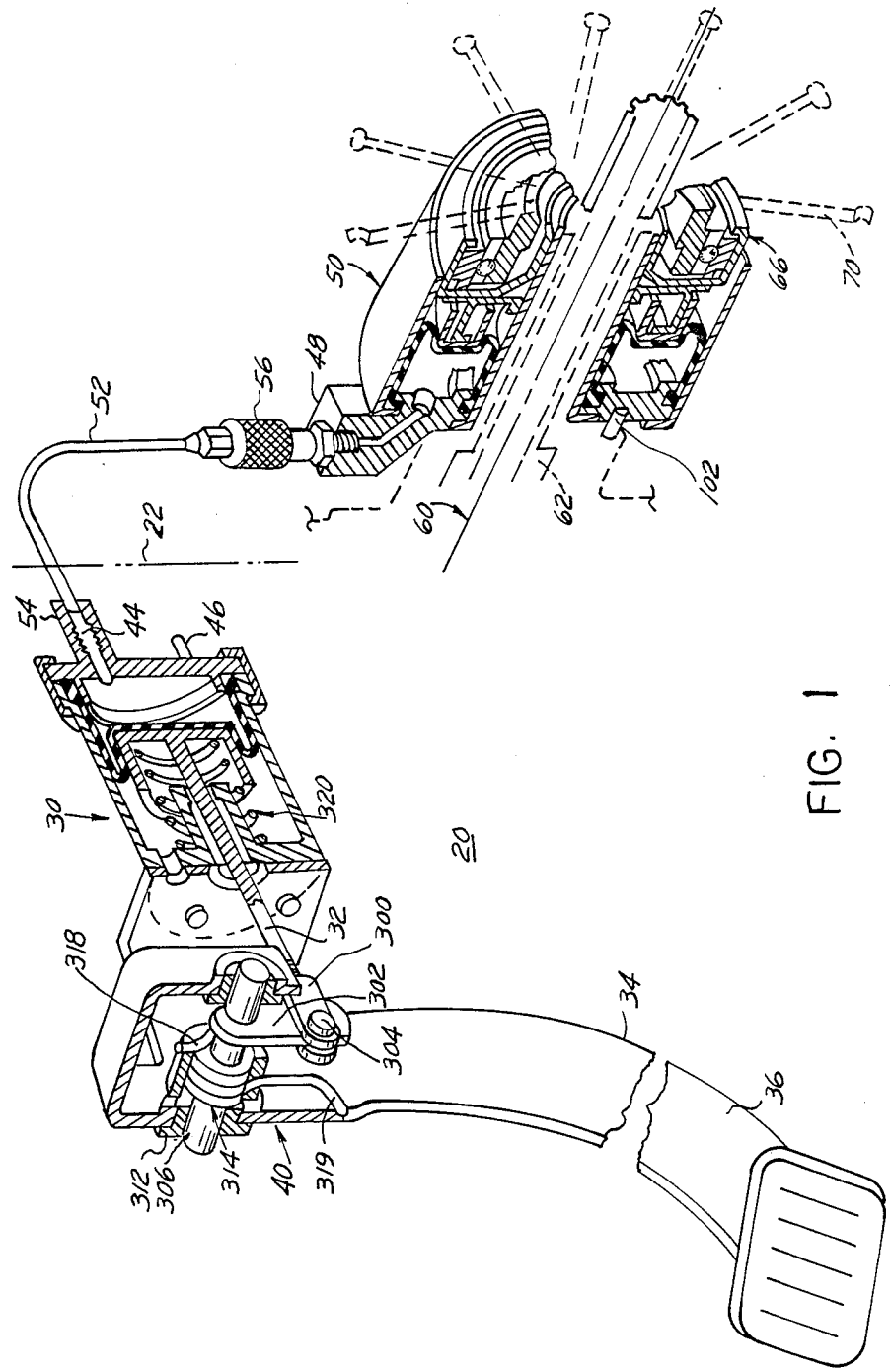
FIG. 1 diagramatically shows the system.

FIGS. 1 and 2 illustrate the major components of one embodiment of a hydraulic actuation system 20 and more particularly a pre-charged actuation system comprising a master cylinder 30 and remotely located slave cylinder 50. The section line 22 schematically shows the fire wall of the engine compartment. Located under the dash board or to the left of the fire wall 22 as illustrated in FIG. 1, is the master cylinder 30 having an operating rod 32 extending therefrom. The operating rod 32 is moved by a clutch pedal assembly 34 in concert with a slack adjusting or compensating mechanism 40 which interconnects the pedal 34 and rod 32.

The master cylinder 30 comprises a first or activation port 44 and a bleed port 46. Bleed ports are not necessary to practice the present invention in the context of a pre-charged system. The master cylinder 30 is connected to an input port 48 of a slave cylinder or hydraulic clutch actuator generally shown as 50 by a hydraulic line 52 which may be pre-charged with hydraulic fluid. The hydraulic line 52 may be attached to the activation port 44 and to the input port 48 by quick connect couplings 54 and 56, respectively. The slave cylinder 50 is mounted to a transmission 60, and, more particularly, is coaxially mounted about a clutch shaft transmission extension tube 62.

The operating rod 32 includes a bifurcated extension 300 which is pivotably attached to a link 302 at a pivot 304. The link 302 is fixedly attached to an activation rod 306 which is rotationtionally supported within a bracket. The bracket may also support the master cylinder 30. Secured about the rod 306 is a spring cage 312. A spring 314 is loose wound about the rod 306. The spring 314 includes a first end 318 secured to the spring cage 312 and a second end 319 secured to the pedal 36. In operation, as the pedal 36 is depressed the spring 314 is wound tightly about the rod 306. As the spring tightens the rod 306 and link 302 rotate thereby moving the operating rod 32. When the clutch pedal is released the spring 312 relaxes thereby permitting the operating rod 32 to move outwardly to a new equilibrium position. This feature is significant in the context of a precharged hydraulic activation system. As will be seen from the discussion below, as the clutch plate wears, additional hydraulic fluid is slowly urged into the master cylinder 30 which in turn pushes the operating rod outwardly. The mechanism 40 permits this outward motion while retaining a desired free play in the clutch pedal.

Two embodiments of a slave cylinder assembly are shown in FIGS. 2 and 3 respectively. The embodiment shown in FIG. 3 in preferably used within a precharged or closed system and adapted to fit about a quill or mounting member 80 of a typical transmission. The slave cylinder assembly 50' of FIG. 2 is more suited for an open system, i.e., one in which a master cylinder 20 comprises a reservoir. In addition, the quill 80' thereof forms part of the slave cylinder assembly. In either case the slave cylinder 50 or 50' comprises a throw-out bearing 66 which is moved against the spring fingers 68 of a clutch diaphragm, generally noted as 70, to operate a pressure plate 72 in a known manner.

As shown in FIG. 3 the transmission 60 includes a quill or mounting member 80 which includes a substantially hollow cylindrical member 82 defining a bore 84 through which is received the transmission extension tube 62. The hollow member 82 terminates at one end in a radially extending mounting plate 86 which is secured to transmission components by conventional means. FIG. 4 illustrates an isolated plan view of the quill 80 taken through section 4—4 of FIG. 3 and shows mounting holes 83.

The slave cylinder assembly 50 is fitted over the quill and comprises a thin, preferably metal, inner tube or sleeve 90 tightly received about the outer surface of the hollow member 82 of the quill 80. The inner tube or sleeve 90 is secured to the quill 80 by a backing plate 92. More specifically, the sleeve 90 includes an outwardly flared end 93 that is swaged to the backing plate 92 and sandwiched upon assembly between the backing plate 92 and quill 80. The backing plate 92 is secured in abutting relation to the mounting plate portion 86 of the quill 80. The backing plate 92 includes an inner annular groove 96 positioned about the sleeve 90 and an outer annular groove 98 concentrically positioned about the inner groove 96. The backing plate 92 further includes a passage 100 that is communicated to the fill port 48 and to an optional bleed port 102 shown in FIGS. 1, and 5.

The quill 82 includes a recess 105 for receiving a member 103 which houses the ports 48 and/or 102.

FIG. 5 is a plan view of the backing plate 92 taken through section 5—5 of FIG. 3.

The slave cylinder assembly 50 further includes a toroidal rolling diaphragm 104 which comprises, at respective ends thereof, mounting beads 106 and 108. More specifically, the diaphragm 104 is supported by the backing plate 92 such that bead 106 is secured between the annular groove 96 and the sleeve 90 while the second bead 108 is secured within the outer annular groove 98 and an outer cylindrical shell 110 which is press fit about a shoulder 112 of the backing plate 92. The diaphragm 104 and backing plate 92 cooperate to define an activation chamber 109.

The slave cylinder assembly 50 additionally includes a bearing support member 120. The bearing support member comprises a cylindrical portion 122 which is slidably received about the sleeve 90 and a radial flange 123 extending therefrom. The flange 123 terminates in an axially extending double walled annular member 126. The walls 128 and 130 of the member 126 are preferably equally spaced from the sleeve 90 and the cylindrical outer shell 110 thereby providing a pair of coaxially disposed annular spaces 152 and 154 into which the diaphragm 104 is received. An annular piston 134 having a substantially U-shaped cross section is loosely secured to the double walled annular member 126. The piston 134 and member 126 provide a means for rotationally isolating the diaphragm 104 from the throw-out bearing 66. In the event that the throw-out bearing seizes, the diaphragm 104 will not be ripped.

Extending radially outwardly from the cylindrical portion 122 of the bearing support member 120 is an annular outer shield 140. The outer shield 140 slidably engages the inner diameter wall of the outer shell 110. In this manner, dirt and other particulates are prevented from contaminating the toroidal diaphragm 104, piston 134 and member 126. The outer edge 146 of the shield 140 preferably contains an arcuately shaped, concave groove to reduce the sliding friction at its interface with the outer shell 110.

The throw-out bearing 66 is supported by and movable with the bearing support member 120. The throw-out bearing comprises an inner race 142 supported on the cylindrical portion 122 and an outer race 144 loosely received within the outer shell 110. The outer race 144 is preferably arcuately shaped for engagement with the spring fingers 68 of the clutch diaphragm 70.

The outer shell 110 extends over the backing plate 92 and secures the diaphragm 104 thereto. The shell 110 includes means such as tabs 114, shown in FIG. 5, which are received in slots 116 fabricated in the backing plate 92 for fastening the outer shell 110 thereto.

The cylindrical portion 122, also shown in the isolated view of FIG. 6, includes a plurality of openings 150 thereabout which are positioned under the inner race 142 of the throw out bearing 66. These openings 150 may be preloaded with lubricant to enhance the sliding motion of the bearing support member 120 on the sleeve 90.

Prior to assembly to the transmission the slave cylinder assembly 50 is pre-charged with fluid. A retaining ring 147 is tightly, though slidably fitted about the inner sleeve 90 and retains the slave cylinder 50 in a compact pre-assembled condition. Upon the first depression of the clutch pedal 36, the diaphragm 104 urges the bearing support 120 outwardly to its activated condition thereby moving the retaining ring 147 to the left, as viewed in FIG. 3. Once moved the retaining ring 147 does not effect the operation of the throw-out bearing 66.

FIG. 2 shows an alternate embodiment of a slave cylinder 50'. The inner tube 90 is generally positioned away from a hollow member 82' of a quill 80' which is now a part of the slave cylinder assembly. In addition the bearing support 120 includes an annular collar 320 slidably positioned on the hollow member 82'. The collar 320 includes an axial extension 322 upon which the cylinder portion 122 (shown in FIG. 3) is attached. The throw-out bearing 66 is supported on the cylindrical portion 122 in a manner similar to that previously described. The inner tube 90 is attached, at one end to the axial extension 322 and supported at its other end by a shoulder 324 formed in the member 82'. A spring 326 is provided between the collar 320 and shoulder 324 for lightly biasing the throw-out bearing 66 against the spring fingers 68. Fitted through the collar 320 and member 82' is a shear pin 330. The shear pin 330 maintains the assembled slave cylinder 50' in a compact configuration prior to and during assembly to the transmission. During the initial depression of the clutch pedal 36 the diaphragm 104 moves the throw-out bearing support outwardly and shears off the pin 330.

Figure 7:
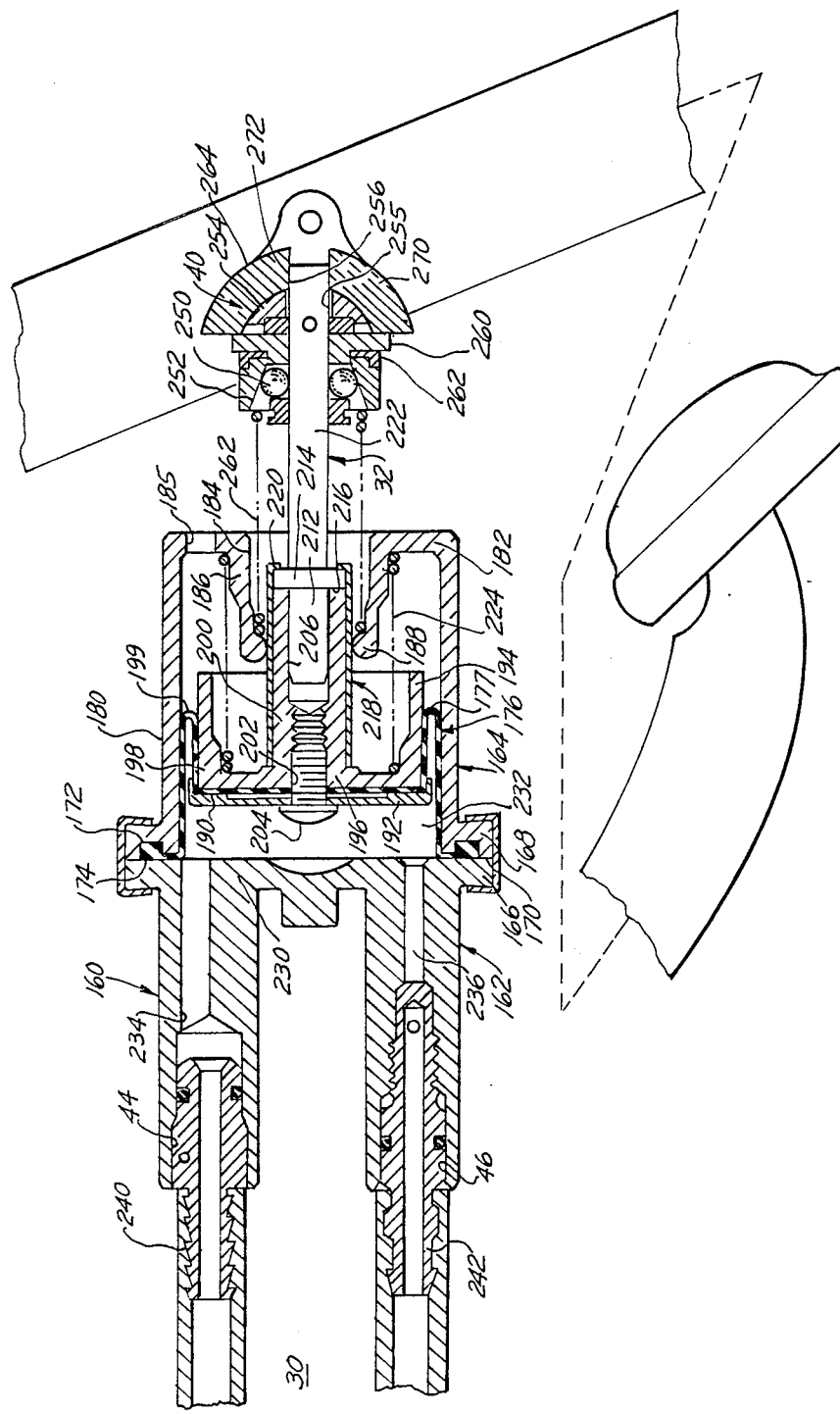
FIG. 7 is a cross-sectional view of the master cylinder.

Reference is made to FIG. 7 which illustrates the major features of the master cylinder 30. The master cylinder comprises a housing 160 adapted to be secured under the dash by appropriate brackets as shown in FIG. 1. The housing 160 comprises first and second housing members 162 and 164 that are joined together such as at mating shoulders 166 and 168 by a retaining clip 170 or other similar means. The shoulder 168 further includes an annular groove 172 for securing therebetween a bead or lip portion 174 of a rolling diaphragm generally indicated as 176. The second housing member 164 is generally cup-shaped having walls 180 and end 182 open at 184. The second housing member 164 further includes a vent hole 185. The opening 184 is formed by an inwardly directed boss 186. The boss 186 extends inwardly from the end 182 and terminates at an annular, preferably spherical support 188. This support 188 serves as a guide for a rod 200 (rod 32) provides a contact surface about which the rod 32 may rotate or pivot and eliminates the need for bushings used in prior master cylinders and permits the compact packaging of the master cylinder 30.

A central portion 190 of the toroidal diaphragm 176 is secured between an end cap 192 and a generally annular shaped piston 194. The piston 194 comprises a circular end 196 in contact with the central portion 190 of the diaphragm and an annular, outer wall 198 axially extending therefrom, parallel to and spaced, generally shown as 199, from the inner surfaces of the wall 180 of the second housing member 164. Outer portions 177 of the diaphragm 176 extend between the housing wall 180 and wall 198, within the space 199 and tend to roll therein as the diaphragm is moved axially. Positioned interior of the outer wall 198 is an annular inner member 200 which also extends from the end 196. The end 196 and inner member 200 include a bore 202 for receipt of a fastening means such as a screw 204 or the like for securing the end cap 192 to the piston 194. Oppositely positioned from the bore 202 is another bore 206 extending partially through the inner member 200. The activation rod 32 is received through an opening 184 in the end 182 of the second housing member 164. One end 212 of the rod 32 is received within the bore 206. The rod 32 further includes a first flange 214 which engages an end 216 of the inner member 200. The rod 32 is secured to the inner member 200 by a retaining cap 218 which is positioned about the inner member 200 and includes an inwardly directed lip 220 for securing the rod 32 to the annular member 200. The retaining cap 218 is loosely received about the flange 214 to permit the rod 32 to rotate within the bore 206, thereby rotationally decoupling the rod 32 from the diaphragm 176. This feature prevents the diaphragm from twisting and increases its useful life. FIG. 7 further illustrates an alternate slack adjusting mechanism 40'. The end 222 of the rod 32 extending from the housing 160 is received within the slack adjusting mechanism 40'. Positioned within the second housing member 164 and secured between the ends 182 and 196 is a preload spring 224. The purpose of the preload spring is to maintain residual hydraulic pressure in the system 20.

The first housing member 162 comprises a bottom 230 which may be viewed as an extension of the flange 166. The bottom 230 and flange 166 mate with the second housing member 164 in a manner to define a variable volume hydraulic chamber 232, the other extreme of which is formed by the diaphragm 176, end cap 192, and piston 194. The housing member 162 includes a plurality of passages 234 and 236 which terminate respectively at the actuation port 44 and a bleed port 46. The actuation port 44 and bleed port 46 may be fitted with appropriate connectors 240 and 242 for engagement with a quick disconnect coupling 54. The passages 234 and 236 which extend into the chamber 232, communicate hydraulic fluid to the slave cylinder assembly and to a drain to remove hydraulic fluid and air therefrom.

The slack adjusting mechanism 40' comprises a plurality of rollers 250 which are urged against the control rod 32. A portion of the control rod 32, i.e., portion 222 is received between the rollers 250 and is preferably square shaped. The rollers 250 are urged against the square rod 222 by ramps or wedges 252. The ramps are secured in place by a housing 254 which includes the square shaped opening 255 through which the rod 32 extends. A roller cage 260 is fitted within the housing 254 and includes a plurality of slots 262 for securing the rollers 250 therein.

A spring 262 is received within the boss 186 of the housing member 164 and biases the ramps 252 outwardly from the housing 160 against the support 188. The end 264 of the housing is preferably curved and adapted to receive a hinged cup 270 that is rotatingly secured to the clutch pedal 36. The cup 270 includes an opening 256 for receiving the rod 32.

In operation as the various friction surfaces of clutch wear, the throw-out bearing 66 is urged further into the shell 110. This action compresses the diaphragm 104 within the slave cylinder 50 which in turn causes a slave displacement of the diaphragm 176 within the master cylinder 30. The displacement of the diaphragm 176 in turn urges the operating rod 32 outwardly to a new equilibrium position. The slack adjusting mechanism 40' maintain a constant free motion of the clutch pedal 36 and allows for the movement of the parts of the system caused by the wearing of the clutch friction plate. When the clutch pedal 36 is depressed the cup 270 and the slack adjuster 40' are moved inwardly toward the master cylinder 30. This motion causes the ramps 252 to urge the rollers 250 against the rod 222 thereby moving the rod with the clutch pedal 36. The motion of the rod 222 compresses the diaphragm 176 thereby causing pressurized fluid to activate the slave cylinder 50. When the clutch pedal 36 is released the spring 68 moves the slack adjuster 40 and clutch pedal 36 outwardly. The outward motion of the slack adjuster 40 releases the rollers 250 from the rod 222 thereby permitting the rod 222 to slide therethrough and to compensate for minute repositioning caused by the wearing of the friction plate.

As can be seen from the above, another advantage of the present invention is that its various components, i.e. master cylinder 30, slave cylinder 50, and hydraulic line 52 can each be installed separately. By utilizing a separate hydraulic line 56, not attached to either the master cylinder or slave cylinder 50, installation is made easier. Further, in the context of a pre-charge system, the above components can be filled with fluid prior to shipment ready for installation.

Many changes and modifications in the above described embodiment of the invention can, of course, be carried out without departing from the scope thereof. Accordingly, that scope is intended to be limited only by the scope of the appended claims.

We claim:

1. A hydraulic system for engaging and disengaging clutches, such as a clutch for a manual transmission comprises:

a slave cylinder, remote from and adapted to fluidly communicate with a source of pressurized fluid comprising:
  means for slidably supporting a throw-out bearing proximate the spring fingers of a clutch;
  an axially expandable, variable volume activation chamber defined by a rollng diaphragm adapted to receive pressurized fluid and to urge said throw-out bearing outwardly therefrom;
  means for rotationally decoupling said throw-out bearing from said diaphragm; and wherein
said support means includes a sliding bearing support means comprising an annular support proximate to and exterior of said diaphragm, and wherein said decoupling means comprises
a cup shaped, annular piston loosely fitted to said annular support, between said annular support and a portion of said diaphragm.

2. The system as defined in claim 1 wherein said piston includes inner and outer walls, wherein said walls cooperate with said support means (120) for providing first and second annular spaces (152, 154) into which portions of said diaphragm (104) can enter and roll as said throw-out bearing moves in a direction to compress said diaphragm.

3. The system as defined in claim 2 wherein said slave cylinder includes means for preventing contaminates from reaching the diaphragm comprising an annular, rigid shield, movable with said throw-out bearing including an end portion in sliding contact with an outer tube or shell.

4. The system as defined in claim 3, wherein said end portion proximate said outer shell is concavely shaped.

5. The system as defined in claim 1 wherein said slave cylinder includes a movable ring situated about an inner sleeve for maintaining said throw-out bearing in a compressed configuration prior to and during installation, said ring being outwardly movable when said diaphragm is pressurized by said master cylinder.

6. The system as defined in claim 1 wherein said slave cylinder includes a spring for outwardly biasing said throw-out bearing.

7. The system as defined in claim 6 wherein said slave cylinder includes a shear pin (330) received through said bearing support means and into a non-moving element wherein said shear pin (330) is sheared off upon the initial pressurization of said diaphragm (104).

8. The system as defined in claim 1 wherein the source of pressurized fluid is a master cylinder comprising:

a housing including at least one port communicated to a pressure chamber, said pressure chamber formed in part by a second rolling diaphragm;
a control rod received through an open end of said housing for working said second diaphragm;
means for guiding the motion of said rod as it is reciprocatively moved within said housing; said guiding means including means for permitting said control rod to rotate or pivot about a direction substantially perpendicular to the length of the control rod;
a piston attached at one end thereof to a middle portion of said second diaphragm; means for rotationally attaching said piston at another end thereof to said rod; said piston including an annular outer wall, and said outer wall cooperating with said housing to provide an annular space into which outer portions of said second diaphragm extend or roll as said second diaphragm is axially moved therein.

9. A hydraulic system for engaging and disengaging clutches, such as a clutch for a manual transmission comprises:

a master cylinder capable of pressurizing fluid upon demand;
a slave cylinder, remote from and adapted to fluidly communicate with said master cylinder comprising:
  slidably supporting a throw-out bearing proximate the spring fingers of a clutch;
  an axially expandable, variable volume activation chamber defined by a rolling diaphragm adapted to received pressurized fluid and to urge said throw-out bearing outwardly therefrom;
  means for rotationally decoupling said throw-out bearing from said diaphragm; and wherein said master cylinder comprises:
a housing including at least one port communicated to a pressure chamber, said pressure chamber formed in part by a second rolling diaphragm;
a control rod received through an open end of said housing for working said second diaphragm;
means for guiding the motion of said rod as it is reciprocatively moved within said housing; said guiding means including means for permitting said control rod to rotate or pivot about a direction substantially perpendicular to the length of the control rod;
a piston attached at one end thereof to a middle portion of said second diaphragm; means for rotationally attaching said piston at another end thereof to said rod; said piston including an annular outer wall, and said outer wall cooperating with said housing to provide an annular space into which outer portions of said second diaphragm extend or roll as said second diaphragm is axially moved therein.

10. The system as defined in claim 9 wherein said guiding means comprises an axially extending member (186), positioned about and spaced from said rod (32) including an inwardly directed radial member (188) for contacting and for radially guiding said control rod.

11. The system is defined in claim 10 wherein said guiding means includes a spherical surface (188) formed on an end (188) of said radial member.

12. The system as defined in claim 9 wherein a portion of said rod extending from said housing is square shaped, and wherein said portion is received within or moved by a slack adjusting mechanism, said slack adjusting mechanism comprising:

housing means slidably positioned on said portion of said control rod, including an opening through which said portion extends;

a plurality of rollers positioned about said portion,
a like plurality of ramps for urging said rollers into contact with said portion as said housing means is moved to an activated position wherein said housing means includes an arcuately shaped end including said opening and wherein said system includes a clutch pedal comprising a hinged cup for receiving and for moving said housing means to its activated position.

13. The system defined in claim 12 wherein said slack adjusting means includes a spring for biasing said ramps outwardly from said master cylinder such that pressure on said rollers is released when said clutch pedal is released thereby permitting said control rod to move freely, outwardly through said housing means in response to the movement of said second diaphragm due to fluid returning to said pressure chamber.

14. The system as defined in claim 9 including slack adjusting means comprising:
    an activation rod (306);
    a link (802) attached to said control rod, and movable therewith, said limb pivotably attached said control rod (32);
    a spring (312) loosely received about said activation rod (306) including one end (316) supported by a housing means (312) and another end (318) movable with a clutch pedal (36), said spring being wound tightly about said activation rod when the pedal is depressed.

* * * * *